Oct. 27, 1953  D. C. COX  2,656,923
GRAVITY SORTER AND FAST NORMALIZER
Filed Dec. 13, 1948  5 Sheets-Sheet 1
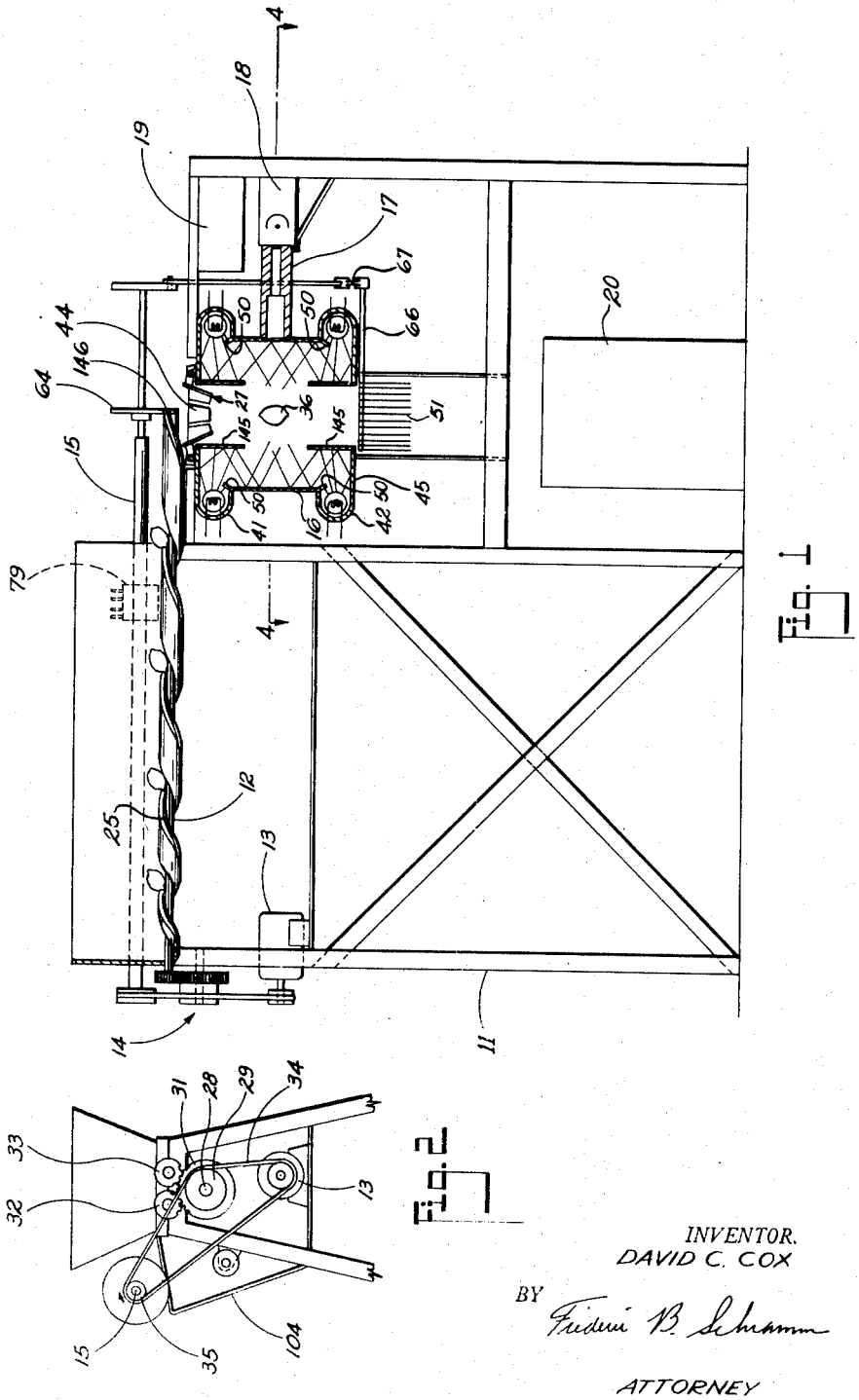
INVENTOR.
DAVID C. COX
BY Frederic B. Schramm
ATTORNEY Oct. 27, 1953  D. C. COX  2,656,923
GRAVITY SORTER AND FAST NORMALIZER
Filed Dec. 13, 1948  5 Sheets-Sheet 2
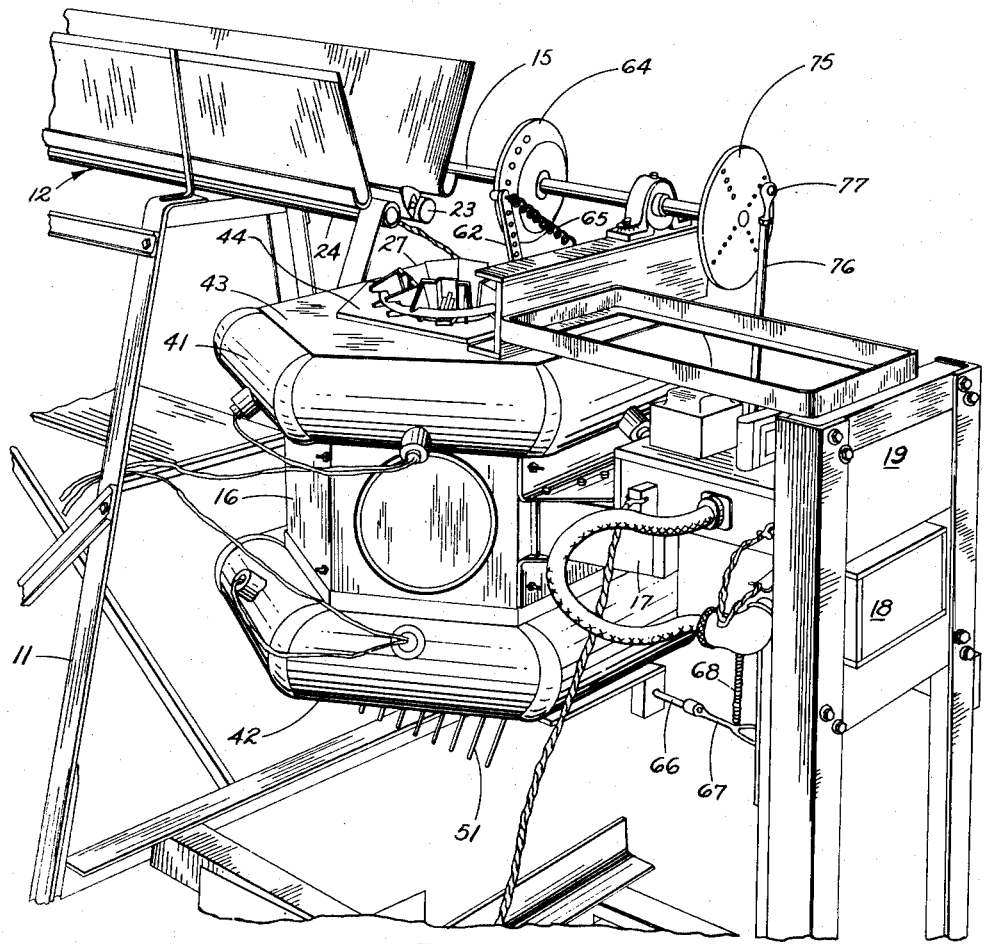
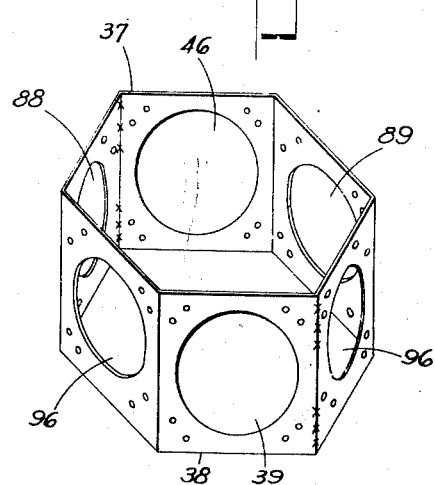
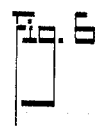
INVENTOR.
DAVID C. COX
BY
ATTORNEY Oct. 27, 1953  D. C. COX  2,656,923
GRAVITY SORTER AND FAST NORMALIZER
Filed Dec. 13, 1948   5 Sheets-Sheet 3
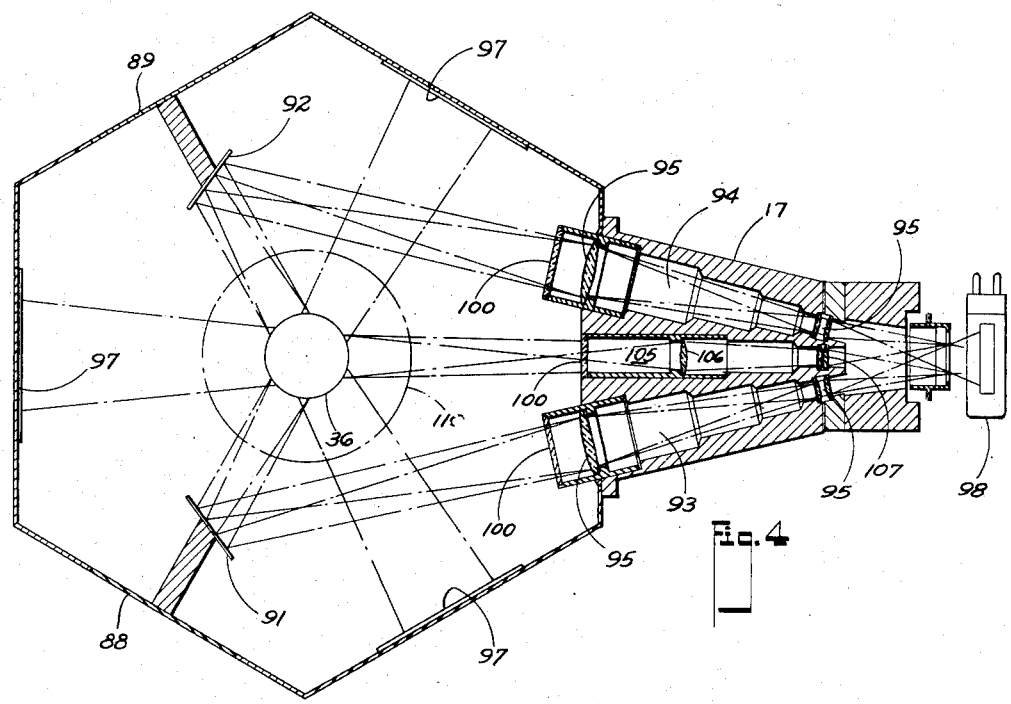
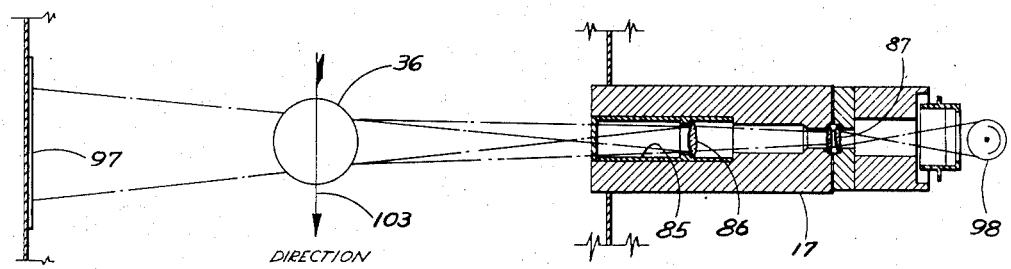
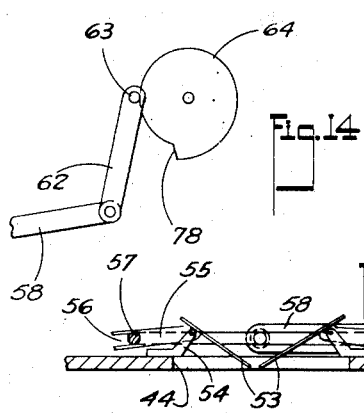
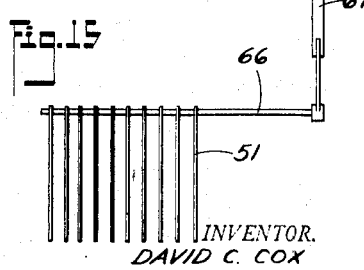
INVENTOR.
DAVID C. COX
BY Frederic B. Schramm
ATTORNEY

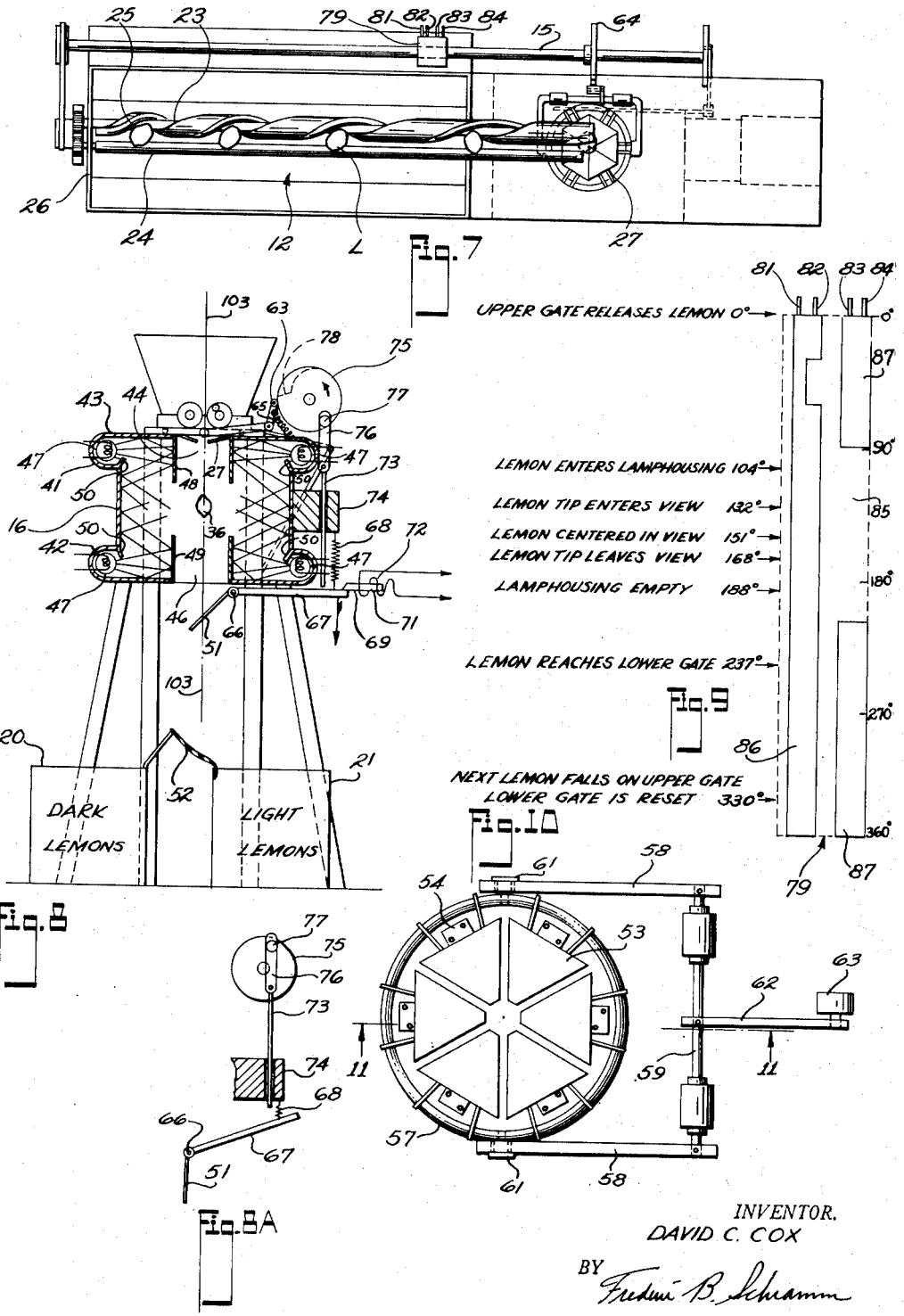

Oct. 27, 1953         D. C. COX         2,656,923

GRAVITY SORTER AND FAST NORMALIZER

Filed Dec. 13, 1948         5 Sheets-Sheet 5

INVENTOR.
DAVID C. COX

BY Frederic B. Schramm

ATTORNEY

Patented Oct. 27, 1953

2,656,923

UNITED STATES PATENT OFFICE 2,656,923

GRAVITY SORTER AND FAST NORMALIZER

David C. Cox, Grand Rapids, Mich., assignor to Electric Sorting Machine Company, Grand Rapids, Mich., a corporation of Michigan Application December 13, 1948, Serial No. 64,967

6 Claims. (Cl. 209—111)

My invention relates to article sorting and to avoiding errors in operation of sensitive electronic circuits responsive to characteristics of articles being sorted.

It is an object of the invention to obtain more accurate and reliable sorting of articles which are sorted by employment of their light reflective properties.

A further object is to normalize or stabilize electronic circuits for rendering them unaffected by unavoidable changes in such circuit constants and electrical properties as tend to cause drift in the magnitude of input values which are required to produce circuit actuation.

Still another object of the invention is to enable free falling articles to be sorted without requiring that the articles be located mechanically or supported during the operation of the selective mechanism serving to sort the articles.

Another object of the invention is to obtain a response to predetermined light reflective properties of any portion of a surface of articles to be sorted and to provide a lamp housing enabling this object to be accomplished.

A further object of the invention is to enable articles such as lemons and other fruits and relatively fragile articles to be sorted automatically at a high rate of speed without bruising or otherwise damaging the articles.

Still another object of the invention is to enable amplifiers of the electronic type to operate in a manner simulating characteristics of long time constant circuits, so as to obtain very precise, sensitive, and accurate response or actuation as a result of minute deviation in the light reflective properties of a sorted article from a predetermined standard of comparison, while retaining characteristics simulating those of short-time-constant circuits for enabling the circuit to be normalized or have its bias corrected very quickly during the intervals between sorting operation, in order to compensate for circuit variations and drift in characteristics of various circuit elements.

Other and further objects, features and advantages of the invention will become apparent as the description proceeds.

In carrying out the invention in accordance with a preferred form thereof, as applied to the sorting of articles such as lemons, I provide a framework supporting at the upper portion thereof, a substantially horizontal conveyor adapted to receive lemons or other articles at one end and having a sorting head mounted below the other end of the conveyor. The sorting head includes a lamp housing having a vertical passageway therein for freely falling objects with an upper gate normally closing the upper end of the passageway and a lower gate at the lower end of the passage for enabling the objects to be diverted in one direction or another, according to the response produced in the sorting mechanism. The lamp housing has side walls shaped to form a hexagonal prism and lamps mounted slightly beyond the upper and lower edges of the side walls for indirectly illuminating the interior of the lamp housing and casting diffused light upon the articles falling along the axis of the prism. Background screens or reference backgrounds are provided along three alternate vertical walls of the prism to serve as standards of comparison of the light reflective properties of the articles being sorted, and at the three remaining side walls light-receiving and directing elements are provided.

If desired, each of these light-receiving and directing elements may comprise a lens system adapted to form received light into a beam projected against a photoelectric tube. Preferably, however, two of the light-directing elements comprise mirrors mounted at such an angle as to reflect the light toward the wall containing the lens system forming the remaining light-directing element, and a single photoelectric tube is provided for response to the reflected light in all three of the beams of light. This arrangement is preferable for the sake of simplicity and minimum cost of apparatus, especially in the case of a photoelectric sorting operation carried out by what is known as the "light trip" method. This is a method in which the mechanism is actuated whenever the light reflective properties of the article integrated over substantially the entire surface thereof exceed a predetermined value. In other words the light trip method is the one in which all lemons lighter than a predetermined standard produce actuation of the mechanism, tripping the lower gate open and enabling such lemons to fall into one receptacle, and all lemons darker than the predetermined standard produce no actuation of the mechanism in consequence of which the lower gate diverts such lemons into another receptacle.

Preferably electronic amplifiers are employed for increasing energy output of the photoelectric tube sufficiently to cause operation of an electromagnet plunger or the like for tripping the lower gate.

Cam mechanism or the equivalent is preferably provided for opening and closing the upper gate at a predetermined rate and a second cam mechanism or eccentric, or equivalent mechanism, is provided for resetting the lower gate to the closed or diverting position at the same rate. Mechanical drive is provided with gearing of such ratio and so related to the cam and the eccentric that an article progresses to the end of the conveyor and falls upon the upper gate once for each operation of the upper gate, and during the time interval while the upper gate is closed after it has allowed the previous article to fall through the passage in the lamp housing. Likewise, the connections are such as to cause the eccentric to reset the lower gate once for each operation of the upper gate during the interval after an article has fallen through the passage in a lamp housing and while the upper gate is closed.

Although the invention is not limited thereto, preferably I employ a thyratron type of tube, that is a vapor discharge or gaseous discharge amplifier tube, for energizing the tripping magnet of the lower gate which causes it to open upon actuation of the light-responsive mechanism. One or more stages of vacuum tube amplification are interposed between the photoelectric tube and the control electrode or grid of the thyratron tube. A circuit breaking switch or commutator also synchronized with the conveyor, upper gate cam, and the lower gate resetting mechanism is provided in the anode supply circuit of the thyratron tube in order that it may be de-energized after each operation of the lower gate tripping mechanism and be prepared for a subsequent operation.

In order that the point at which the thyratron is tripped in relation to the intensity of the illumination of the photoelectric tube will remain accurately constant and unaffected by various tendencies toward drift, such as aging of the various tubes and filaments, heating of resistors, variations in filament voltage, dust, fingerprints and the like in the lens system and other portions of the optical system, the mechanism is provided with what I call a normalizer. The normalizer serves for intermittently resetting the bias of the operating tube at which it is neutral with respect to the photoelectric tube. This is accomplished by providing a condenser coupling between the anode of the vacuum tube amplifier and the control grid of the thyratron, or between two equivalent points of the circuit, and resetting the potential on this condenser intermittently and preferably subsequent to each operating cycle of the light trip mechanism.

For the sake of obtaining high precision the condenser is preferably relatively large and for the sake of obtaining high gain the vacuum tube load resistor or anode resistor is preferably relatively large and the vacuum tube is preferably a pentode tube. Normalization is accomplished by intermittently connecting one side of the normalizing condenser to a point maintained at a predetermined potential. The use of such large condensers and large load resistors, however, tends to result in a very long time constant preventing complete normalization of the condenser potential difference during the brief interval of time allowed in the short operating cycle corresponding to a high sorting speed and high frequency of presentation of articles to the photoelectric system. In order to obtain the equivalent of a short-time constant during the normalizing operation, one or more cathode follower tubes are employed. At least one cathode follower tube is employed which is interposed between the last stage vacuum tube amplifier anode and the thyratron control grid so that the charging or discharging current of the condenser during normalization is provided through the cathode follower instead of an anode resistor or other circuit constants. In order to enable a potential-supply of low-current output to be employed for normalizing, a second cathode follower is preferably also provided.

A better understanding of the invention will be afforded by the following detailed description considered in conjunction with the accompanying drawings, in which Fig. 1 is a side elevation partially in section of a photoelectric lemon sorter forming an embodiment of the invention;

Fig. 2 is a fragmentary end view of the apparatus of Fig. 1 as seen from the left-hand end;

Fig. 3 is a perspective view of the portion of the apparatus of Fig. 1 including the lamp housing;

Fig. 4 is a cross-sectional view of the lens housing represented as cut by a horizontal plane 4—4, indicated in Fig. 1;

Fig. 5 is a vertical mid-section of the portion of the apparatus shown in Fig. 4;

Fig. 6 is a perspective view of the lamp housing employed in the apparatus of Fig. 1;

Fig. 7 is a plan view of the apparatus of Fig. 1;

Fig. 8 is an end elevation partially in cross-section of the apparatus of Fig. 1 as seen from the right-hand end;

Fig. 8A is a fragmentary view of a portion of the apparatus of Fig. 8, showing the lower gate resetting mechanism in another position;

Fig. 9 is a developed view of a drum switch used in the apparatus of Fig. 1;

Fig. 10 is an enlarged, detail plan view of the upper gate of the apparatus shown in Figs. 1 and 7;

Fig. 11 is a fragmentary view partially in section of the apparatus of Fig. 10 represented as cut by a vertical plane 11—11;

Fig. 14 is a fragmentary view of the upper-gate operating mechanism; and

Fig. 15 is a plan view of the lower gate.

Like reference characters are utilized throughout the drawings to designate like parts.

Figure 12:
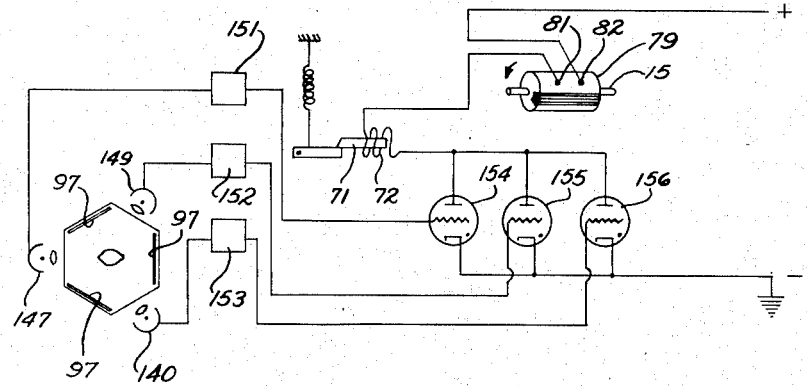
Fig. 12 is a schematic and circuit diagram of an alternative form of electrical mechanism which may be employed in the apparatus of Figs. 1 to 11.

The apparatus shown by way of illustration in Fig. 1 comprises a suitable framework 11 supporting a conveyor system 12, shown as being of a progressively moving type such as the screw type with a drive motor and speed-reduction gear unit 13, gearing 14, a timer shaft 15 with associated apparatus to be described in greater detail hereinafter, a lamp housing and viewing chamber 16, a lens housing 17, a photoelectric tube housing 18, an amplifier case 19 and lemon receptacles 20 and 21, only one of which is visible in Fig. 1.

As shown more clearly in Fig. 7, the lemon conveyor 12 comprises a pair of horizontal shafts 23 and 24 set close enough together so that the lemons or other articles to be sorted cannot fall through the space between them. One of the shafts 23 has a helical flange or screw 25, formed by a length of large copper tubing wound upon the shaft and secured thereto. Ordinarily the initial pitch of the helix 25 is so chosen as to exceed the maximum expected dimensions of the articles to be sorted, such as lemons, so that the articles will be spaced, as shown in Fig. 7, at distances of the order once-and-a-half or twice their maximum dimensions. Preferably the spiral 25 is graduated so that its pitch increases along the length of travel for causing the separation between articles to increase. The space behind the spiral may be filled in to form a spiral groove of substantially constant width. The conveyor shafts 23 and 24 extend from the left-hand end 26 at which the articles to be sorted are deposited thereon to a point above an upper gate 27 provided above the lamp housing 16.

The drive mechanism 14, as illustrated in Figs. 2 and 7 for the conveyor 12, comprises a jack shaft 28 carrying a drive pulley 29 and a gear 31 with which are meshed two driven gears or pinions 32 and 33. The pinions 32 and 33 are keyed to the conveyor shafts 23 and 24 respectively. There is a belt or chain 34 enabling the pulley 29 to be driven by the motor 13, which may include speed-reduction gearing, not separately shown. The timer shaft 15 also carries a pulley 35 over which the belt or chain 34 passes. The relative diameters of the pulleys 29 and 35 in relation to the relative diameters of the gear 31 and the pinions 32 and 33 are so chosen that the timer shaft 15 rotates synchronously with the conveyor shaft 23, assuming a single pitch screw 25. It is to be understood that the arrangement of the mechanism driven by the timer shaft 15 and the conveyor 12 is such that one operation of the mechanism driven by the timer shaft 15 is obtained for each delivery of an article, such as a lemon 36, from the conveyor 12 to the upper gate 27.

The lamp housing 16 preferably comprises side walls, illustrated in Fig. 6, formed in the shape of a hexagonal prism. For example, sheet metal may be bent to shape, as shown, with one or more joints 37 welded or brazed to form a unitary structure. Each of the side walls or faces 38 is provided with an opening 39 to receive an optical device, such as a background screen or a light-directing object such as a mirror or lens system, as will be described more in detail hereinafter. Annular lamp pockets or channels 41 and 42 are joined to the hexagonally formed side walls 38 at their upper and lower edges respectively. The upper wall 43 of the upper lamp channel 41 is extended inwardly to form the top wall for the lamp housing 16 with an opening 44 therein at which the upper gate 27 is mounted. Likewise, the lower wall 45 of the lower lamp channel 42 is extended inwardly to form a lower wall for the lamp housing 16 with an opening 46 therein. Lamps 47 are mounted in the lamp channels 41 and 42. In order to shield the falling lemon 36 from the direct rays of light from any of the lamps 47, flanges 50 are provided, as shown in the drawing. There are shields 48 and 49 joined respectively to the upper wall 43 at the edge of the opening 44 and to the lower wall 45 at the edge of the opening 46, for equalizing the illumination of the article 36 from various directions, by overcoming excessive light from the ceiling and the floor of the lamp housing.

The lens housing 17 is set into one of the side wall openings 39 so as to close the same. As will be explained in the course of further description, the other openings are also closed so that the lamp housing 16 forms a light-tight box, except for the upper opening 44 and the lower opening 46, between which a vertical passageway is formed for objects 36 falling from the end of the conveyor 12. The space in this passageway between the lower edge of the shield 48 and the upper edge of the shield 49 forms a viewing chamber in which all sides of the objects 36 are exposed to the view of a photoelectric cell in the cell box 18, without any necessity for holding the object and without any portion of the object being obscured by a lamp or by a holder, rest or other support. The upper opening 44 of the lamp housing 16 is normally substantially closed by the upper gate 27. The lower opening 46 is not closed but relatively little light enters the lamp housing 16 from below.

Instead of a lower closure at the lower end of the passageway 44 and 46, a resiliently constructed lower gate diverter, or deflector 51 is provided having a normal position sloping, as shown in Fig. 8, and adapted to be dropped to a lower or fully opened position, as represented in Fig. 8A, in which the deflector is substantially vertical. A cam or eccentric mechanism, driven by the timer shaft 15, as described more fully hereinafter, is provided for operating the upper gate 27 and for resetting the deflector 51.

The receptacles 20 and 21 which may take the form of bins or, in the case of fragile articles, flumes containing flowing water for floating the sorted articles away, are mounted on either side of the point directly below the lower opening 46. The receptacle 20 is so mounted that the articles falling upon the lower gate or deflector 51 in its normal position are diverted into the receptacle 20. A resilient diversion chute 52 is provided directly below the opening 46 for diverting the falling articles into the receptacle 21 when the deflector 51 has been depressed to its fully opened position, illustrated in Fig. 8A. In this manner the deflector or diverter 51 serves as a selecting mechanism or classifier for classifying articles according to their reflectivity or color and therefore according to the consequent output of the photoelectric mechanism. Preferably the chute 52 is composed of a resilient material, such as rubber, plastic or the like, to avoid damage to the falling articles.

The photoelectric mechanism may be made responsive either to the color or the reflectivity of the article falling through the viewing chamber and the lamp housing 16. For the sake of illustration, however, the photoelectric mechanism will be described as being of the type responsive to reflectivity. It may be set either for operation upon a reflectivity exceeding a predetermined value or for operation upon a reflectivity falling below a predetermined value. For the sake of illustration, it is assumed that it is set for what is known as "light trip." In this case the receptacle 20 is the receptacle for dark lemons and the receptacle 21 is the receptacle for light lemons. The timer shaft 15 and the mechanism driven by it are so set that the upper gate 27 opens as often as the conveyor 12 deposits a lemon upon it, but slightly later than this instant. The timer mechanism is also so arranged as to reset the lower gate or deflector 51 to the position shown in Fig. 8, during the interval after an article has fallen through the lamp chamber 16 and before the upper gate 27 is again opened. Accordingly, if the lemon 36 is lighter than a predetermined value for which the system is set, the deflector 51 is depressed and the article is dropped into the light lemon receptacle 21. On the other hand, if the lemon is darker than the predetermined value for which the apparatus is set, the gate 51 remains in the position shown in Fig. 8 and deflects the article to the dark receptacle 20.

Figure 13:
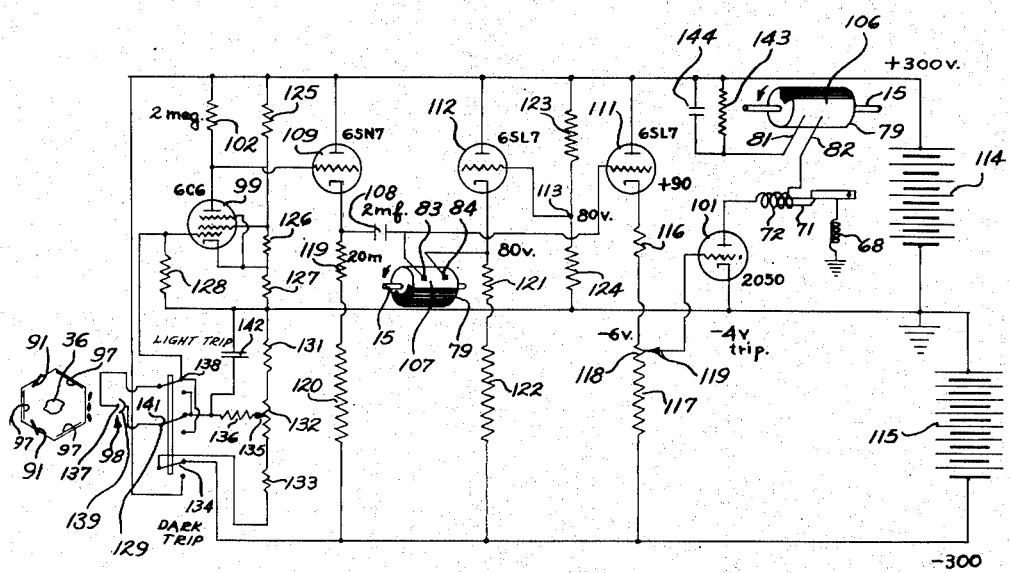
Fig. 13 is a schematic and circuit diagram of the apparatus of Figs. 1 to 11 employing an optical system such as illustrated in Figs. 3 and 4.

The photoelectric and amplifier apparatus for accomplishing the operation of the deflector 51, according to the light reflectivity of the falling article 36, is represented schematically by a circuit diagram in Fig. 13.

As illustrated in Figs. 10 and 11, the upper gate 27 comprises a plurality of sector shaped doors or leaves 53 mounted upon hinges 54 around the periphery of a circle coaxial with the lamp housing 16 at the edges of the hexagonal upper opening 44 of the lamp housing 16. As shown by the drawings, the leaves 53 are symmetrical and are symmetrically disposed, so that when the upper gate is closed the leaves slope down inwards toward a center point so as to center each article in a position at the top of its falling path and consequently center the falling path of the articles in the lamp housing. To each sector 53 is secured an operating lever 55, provided at the outer end with a slot 56. For operating the levers 55 in unison, a ring 57 is provided which fits in each of the slots 56 and is adapted to be moved upward or downward according to whether the gate 27 is to be opened or closed. For producing such vertical movement of the ring 57, a pair of arms 58 is provided, which are secured to a shaft 59 and connected to the ring 57 by pintles 61. For operating the arms 58 a crank 62 is provided carrying a cam follower 63. A cam 64 adapted to engage the cam follower 63, is mounted upon the timer shaft 15. It is to be understood, however, that the invention is not limited to the specific arrangement illustrated and equivalent mechanism may be provided for accomplishing opening and closing of the gate 27 synchronized with the operation of the conveyor 12. Preferably, a spring 65 is provided for holding the cam follower 63 against the edge of the cam 64.

It will be observed that the upper gate is of the dropping-leaf type. Consequently, when it opens no motion is imparted to the article which has been deposited thereon by the screw conveyor other than the motion produced by the acceleration of gravity. Since the article is already centered, the article falls vertically along a path through the center of the lamp housing. There is no component of horizontal motion. Moreover, the vertical position of the article in the lamp housing at any instant is accurately related to the instant when the upper gate was opened by the law expressing the motion of freely falling objects.

The photoelectric sensing apparatus including photoelectric tube means and amplifier means may therefore be rendered sensitive and capable of fast response to light reflected from the article while it is in the viewing position within the lamp housing without requiring that the sensing means be continually sensitive and mechanism for rendering the sensing apparatus sensitive may be driven synchronously with the upper gate operating mechanism.

In order to avoid damage to fragile articles, such as fruit, the deflector 51 is composed of relatively resilient material, such as light, flexible, rubber-coated wire rods for example, each secured at one end to a shaft 66, to which is secured an arm 67. In the arrangement illustrated, the arm 67 is provided with a spring 68 for depressing the deflector 51 to the lower or fully opened position shown in Fig. 8A. There is a latch 69 for holding the arm 67 down and the deflector 51 up against the tension of the spring 68. The latch, as illustrated schematically, comprises a sliding bolt 71 formed as an armature or plunger of a solenoid winding 72, adapted to be energized by the amplifier 19 upon response to actuation of the photoelectric cell 18 for retracting the plunger 71 and tripping the deflector 51.

For resetting the deflector 51 and the latch 69 after each operation of the solenoid 72 a synchronously moving resetting rod 73 is provided. The rod 73 is suitably mounted for axially sliding motion as in a guide 74 and is arranged to be moved up and down in synchronism with the operation of the upper gate 27, for example. As illustrated, an eccentric or crank arrangement may be provided comprising a crank disc 75 mounted upon the timer shaft 15 and a connecting rod 76 pivoted at one end to the crank disc 75 by a pin 77 and at the other end to the upper end of the rod 73. The angular position of the crank pin 77 in relation to the dropping portion 78 of the cam 64 is such that the rod 73 is moved downward for resetting the gate 51 slightly before the cam follower 63 is permitted to move to the right under the action of the spring 65 for opening the upper deflector 27. In consequence, the gate 51 is in the reset position shown in Fig. 8, whenever the article 36 falls through the vertical passageway of the light chamber 16. As shown in the drawing the length of the rod 73 is such that its lower end bears against the arm 67 and depresses it slightly below the catch 69 when the crank pin 77 reaches its lowermost position.

The timer shaft 15 also carries a rotary switch or commutator including a drum 79 cooperating with brushes 81, 82, 83 and 84. The drum 79, as illustrated in the surface development view of Fig. 9, comprises a cylinder of insulating material 85 into which are set segments of conducting material such as copper segments 86 and 87, having a shape shown in Fig. 9. The arrangement is such that circuit interruptions take place between the brushes 83 and 84 and between the brushes 81 and 82 once for each revolution of the shaft 15, but the circuit interruption between the brushes 83 and 84 takes place while the circuit is closed between the contacts 81 and 82.

The lens housing 17, illustrated in Figs. 3 and 4, comprises a passageway 105 for direct passage of the light beam intersecting the axis 103 of the lamp housing 16 to a photoelectric cell or tube 98, which includes a lens system such as an objective lens 106 and a condensing lens 107. In this manner the photoelectric tube 98 and the mechanism controlled thereby are effectively placed in operative or communicative connection with the interior of the lamp housing 16. As illustrated in the arrangement of Fig. 12, a photoelectric lens system and a corresponding photoelectric tube may also be mounted in the openings 88 and 89 of alternate hexagonally placed side walls in the lamp housing 16. Nevertheless, in the embodiment of Fig. 3 and Fig. 13, I have, in order to avoid the use of additional photoelectric tubes and in order to simplify the mechanism, employed mirrors 91 and 92 which are mounted upon suitable supports mounted on base plates for closing the openings 88 and 89. The mirrors 91 and 92 are each mounted at such an angle that light beams, passing along the horizontal lines intersecting the vertical axis 103 of the lamp housing 16 and impinging upon the mirrors 91 and 92, are reflected along the axes of passageways 93 and 94 in the lens housing 17. The passageways 93 and 94 are also provided with suitable lenses 95 for causing all three of the light beams to be focused at a common point within the casing 18 for the photoelectric tube 98. Preferably, transparent dust covers 100 are provided. The remaining three openings 96 in the side walls of the lamp housing 16 have mounted therein removable background screens 97 or reference backgrounds of the type described in my Patents #2,244,826 granted June 10, 1941 (designated therein by the reference numeral 30) and #2,325,665 granted August 3, 1946 (designated therein by the reference numeral 46) to serve as standards of comparison of reflectivity of the articles being sorted. Although the lamp housing has been described as a hexagonal prism, it will be understood that my invention is not limited thereto, as a circular or curved surface side wall may also be employed with the reference backgrounds and light-receiving and directing devices mounted at approximately the same angles, viz. alternately, 60 degrees apart. In Fig. 4, the circle 110 represents the clearance between light rays along 93 and 94 and the directional errors of an article falling freely along 103. (As maximum envelope of paths.)

The photoelectric amplifier, represented in Fig. 13, comprises, in addition to the photoelectric tube 98, one or more sensitive amplifier tubes of the high vacuum type and a high current tube such as a gaseous or vapor discharge tube of the thyratron type for energizing the tripping coil 72. I have found, however, by reason of the improved operation obtained in accordance with my invention, that a single stage of amplification is ordinarily sufficient and I preferably employ a single high vacuum tube 99 coupling the photoelectric tube 98 to a thyratron tube 101. In order that a single stage of amplification may be employed, a high vacuum tube 99 is preferably of the pentode type, e. g. a 6C6 type of tube may be employed, and for the sake of obtaining high amplification a high resistance load is provided for the tube 99 consisting of an anode resistor 102 which may have a resistance of two megohms, e. g. in the case of use of a 300 volt power supply.

For capacitatively coupling the thyratron 101 to the pentode 99 a condenser 108 is provided. The capacity of this condenser is made relatively large. In addition, a bias-fixing connection for the grid of the thyratron 101 is, in effect, made through what amounts to infinite resistance during the portion of an operating cycle that the apparatus is functioning for performing a sorting operation or selection. However, in order that effective bias of the thyratron 101 may be restored to a fixed value and this may be done quickly after each operation, what amounts to very low resistance bias connection is provided. This is accomplished by the employment of a "normalizer" switch taking the form in the specific apparatus illustrated of the brushes 83, 84 and the drum switch segment 87. The capacity of the condenser 108 is made relatively large because the output terminal is connected to the grid of tube 111 where minute grid currents will flow and, through a cable to one of the normalizing brushes 83 where leakage currents may flow. Any such currents cause displacement of the setting and by the use of large coupling condensers the extent of the displacement is reduced to a negligible quantity. In other words I aim to obtain, in effect, the characteristics of a direct-current amplifier by approaching an alternating-current amplifier with infinite time constant. Unavoidable leakage currents cause the actual apparatus to fall somewhat short of infinite time constant. However, by employing a condenser 108 having a capacity of two microfarads instead of .02 microfarad, e. g., the stability against leaks is improved by a factor of one hundred.

For the purpose of overcoming what would otherwise be the long time constant effect of the high pentode load resistance 102 and the high capacity 108 in a circuit determining the accuracy and rapidity with which the potential of the grid of the thyratron 101 is restored to its predetermined value after each operation of the apparatus, a cathode follower 109 is interposed between the high potential plate of the condenser 108 and the anode of the pentode tube 99. The rotary switch brush 83 is connected to the low potential plate of the condenser 108 and the brush 84 is connected to a suitable reference voltage which is selected to bring the grid of the thyratron to the desired proximity to the tripping point and is the effective voltage of the bias of the thyratron 101 determining the trip point of the thyratron 101 and the solenoid coil 72. The reference voltage may be the actual critical voltage, any voltage above which would ignite the thyratron 101 when applied to its control grid. However, thyratrons are ordinarily operated with relatively low trip voltage. It is more practicable to employ a higher reference voltage of the order of 80 volts for example. The use of such a high reference voltage would necessitate a high cathode bias for the thyratron. The thyratron may be so operated; but instead a second cathode follower 111 is preferably interposed between the coupling condenser 108 and the control grid of the thyratron 101 for, in effect, translating the trip voltage to lower value.

A conventional voltage divider consisting of resistors connected in series across the regulated power supply may be employed as the reference voltage source. In order to avoid the necessity for low-resistance, high-power consumption resistors in the reference voltage source to assure substantially instantaneous normalization, an additional cathode follower 112 is interposed between the rotary switch brush 84 and a terminal 113 from which the reference voltage is derived. It is to be understood that the invention is not limited to the use of circuit elements with specific numerical values of electrical constants and specific values and tube types are given merely by way of illustration. However, satisfactory results have been obtained with the pentode 99 taking the form of a 6C6 tube, the thyratron 101 a 2050 tube, the cathode follower tubes 109 being the type 6SL7 tube and the cathode followers 111, 112 twin triode elements of a 6SL7 type of tube with a 300 volt power supply. The power supply is represented schematically at 114, but it is to be understood that conventional type power pack, preferably regulated, is utilized in practice. Satisfactory operation of the cathode followers 109, 111 and 112 is obtained with 20,000 ohm resistors connected to the grounded end of the power supply 114. However, to avoid the necessity for biasing the cathode of the thyratron 101 positively, which ordinarily trips at approximately minus four volts in the case of a 2050 tube, the cathode of the tube 111 is preferably connected to a point below ground potential. For this purpose and in order to simplify the circuit arrangement for obtaining light trip operation, a negative power supply 115 is also provided which may, for example, be a 300 volt supply.

The cathode follower 111 is provided with cathode resistance consisting of resistors 116 and 117 in series, the additional resistance provided by the resistor 117 being sufficient to provide additional voltage drop equaling the voltage of the negative power supply 115. An input connection to the control grid of the thyratron 101 may be taken from a point on the resistor 117 which may be made adjustable by the use of a sliding tap 118. The tap 118 is set at such a point that the normal potential of the tap 118, with the grid of the cathode follower 111 at the reference voltage, is a suitable value, such as minus six volts for example, in the case of a thyratron which trips at minus four volts.

The cathode followers 109, 112 are also provided with cathode resistances consisting respectively of resistors 119, 120 in series and 121, 122 in series. The resistors 119, 121 may be connected directly to the ground if desired, but if the additional resistors 120, 122 are employed, their values are so chosen as to give the same voltage drop as the voltage of the negative source 115. The resistances of the cathode resistors 119 and 121 represent, such as 20,000 ohms for example, the effective load resistances of the cathode followers 109 and 112.

The reference voltage terminal 113 may be the junction terminal of resistors 123 and 124, connected in series across the power supply 114 and having a suitable resistance ratio so as to give the desired reference voltage, e. g. 80 volts. In this case the resistors 116 and 117 may be so chosen as to cause the cathode of the cathode follower tube 111 to float at 90 volts when the control grid is held at the potential 80 volts, thereby rendering the voltage of the tap 119 highly sensitive to rise in voltage of the control grid of the cathode follower 111 above the predetermined reference voltage, such as 80 volts.

The pentode 99 is provided with suitable dropping resistors 125 and 126 for providing the screen grid potential and preferably also with a cathode resistor 127 for negatively biasing the control grid, especially when no negative power supply is employed. A suitable grid resistor 128 is provided as in conventional circuits.

The amplifier and normalizer circuit of Fig. 13 is described as used in connection with a gravity sorting machine, such as a lemon sorter, which I prefer to operate on a light trip for actuating a lower gate. It is to be understood, however, that the photoelectric amplifier of Fig. 13 is not limited in use to the sorting machine herein described by way of illustration and may be also used in numerous other types of photoelectric sorting apparatus where either light or dark trip may be desired and where the output of the amplifier represented as the voltage at the point 119 or at the point 83 may be further amplified before supplying it to a thyratron, or may be supplied directly or through amplification to sweep circuits of a cathode ray tube or in connection with color sorting equipment and the like.

For enabling the circuit to operate with either light trip or dark trip, a triple-pole, double-throw switch 129 has been shown to illustrate the difference in connections which will preferably be employed according to whether light trip or dark trip is utilized. If the apparatus is connected for light trip operation the photoelectric tube is provided with a negative potential source through a voltage divider consisting of resistors 131, 132 and 133 in series connected to the negative terminal of the power supply 115 and to ground through switch contacts 134. For the sake of adjustment the resistor 132 is preferably provided with a sliding tap 135. The photoelectric tube 98 is connected between the tap 135 and the control grid of the pentode 99, preferably in series with the current limiting resistor 136. For light trip the connections are such that the anode 137 of the photoelectric tube 98 is connected to the amplifier input through the change-over switch blade 138. Also, for light trip, the cathode 139 of the photoelectric tube 98 is connected to the voltage divider tap 135 through the change-over switch blade 141 and the resistor 136. Preferably, a smoothing condenser 142 is connected between the ground terminal of the power supply 114 and the input terminal of the photoelectric tube. The function of the change-over switch 129 is merely to reverse the connections of the photoelectric tube 98 and to reverse the polarity of the voltage supplied thereto where dark trip is desired instead of light trip.

Where the thyratron 101 is employed, it is preferably connected to the positive terminal of the power supply 114 through a resistor 143 shunted by a smoothing condenser 144. Since tubes of the thyratron type remain conductive even after removal of control voltage, an intermittent circuit-opening switch is provided, taking the form in the arrangement illustrated of the brushes 81 and 82 cooperating with the contact segment 86 of the drum switch 79.

In order that the falling object 36, which is to be sorted by the apparatus, will be illuminated on all sides, but only by diffused light, and the photoelectric tube 98 will be affected only by light reflected from the surfaces of the falling object 36 or the reference backgrounds 97, all of the inner surfaces of the lamp housing 16 are preferably painted with flat white lacquer, except the inner surfaces 145 of the shields 48 and 49 which are painted with flat black lacquer.

The angular position of the output tip end 146 of the helix 25 of the screw conveyor on the shaft 23, and the angular positions of the cam 64, the crank disc 75 and the drum switch 79 on the timer shaft 15 relative to each other as interconnected by the gears 32 and 33, the pulley 35 and the belt or chain 34, are as indicated in the schematic diagram of Fig. 9.

The lemon or other article L being carried along the conveyor 12 reaches the end of the conveyor above the upper gate 27 when the timer shaft 15 and the drum switch 79 are in the angular position represented by 300 degrees, e. g. in Fig. 9. At this instant both pairs of brushes 81, 82 and 83, 84 are in contact with their respective contact segments 86 and 87. Slightly later, e. g. at 360° (0°), the cam 64 reaches the angular position in which the cam follower 63 follows along the portion 73 of the cam 64 causing the sectors 53 of the gate to open allowing the article to fall into the lamp housing 16 along the axis 103 thereof, as represented at 36. The article 36 remains within the field of view of the photoelectric tube 98 (defined by the lines 158, 159 in Fig. 5) as the timer shaft 15 moves from the angular position 132° to the angular position 168 degrees.

During this time electrical circuit between the brushes 81 and 82 remains closed by the segment 106, but the electrical circuit between the brushes 83 and 84 is open, as they now ride upon the insulating portion 85 of the drum 79. Accordingly, the condenser 108 is disconnected from the normalizer potential at the cathode of the cathode follower 112.

If the light reflected from the lemon 36 exceeds a predetermined value the resistance of the photoelectric tube 98 falls to such a value as to cause the input voltage to the pentode 99 to fall below the value at which the potential on the negative plate of the condenser 108, connected to the brush 83, exceeds the predetermined reference voltage, e. g. 80 volts, which causes the potential of the thyratron grid to rise above minus four volts and to fire the thyratron 101. Thereupon, current flows through the trip coil 72 retracting the armature 71 and allowing the spring 68 to lower the gate 51. Accordingly, the lemon 36 falls upon the chute 52 and slides into the light lemon receptacle 21. On the other hand, if the lemon had been darker than the predetermined value it would have fallen upon the lower gate 51 and would have been deflected into the dark lemon receptacle 20.

During the time subsequent to the interval required for the lemon 36 to fall through the field of view of the photoelectric tube 98, the drum switch 79 travels through the angular positions in which the brushes 83 and 84 are in contact through the segment 87. The photoelectric tube 98 is then illuminated only by the light reflected from the reference backgrounds 97. The anode potential of the pentode 99 acquires a value determined by the circuit constants. Since the negative plate of the coupling condenser 108 is held at the reference voltage, e. g. 80 volts, by the connection to the cathode of the cathode follower 112 which has its control grid biased at 80 volts, the potential difference between the plates of the condenser 108 is restored, if necessary, to such a value that when the brushes 83 and 84 are again disconnected the potential of the negative plate of the condenser 108 will rise or fall above or below the reference voltage, such as 80 volts, according to whether illumination of the photoelectric tube has been increased or decreased by presence of a falling article. Therefore, the apparatus is automatically reset or normalized after each operation so as to respond accurately to the presence of any object having a reflective power greater than the reflective power of the backgrounds 97, as in the light trip operation and vice versa in the case of dark trip operation.

If any charging current is necessary for correcting the relative potentials on the two plates of the coupling condenser 108, it is supplied by increasing or decreasing the anode-cathode current flow in the cathode follower tubes 109 and 112, since the current in a cathode-follower automatically increases or decreases whatever amount is necessary to cathode potential to follow control grid potential. It is unnecessary for any current to be drawn through the pentode load resistor 102 or through the resistors 123 and 124 of the reference voltage source. Consequently, these resistances do not enter into the time constant of the charging circuit of the condenser 108. The time constant is, in effect, very small for the reason that the effective resistances of the cathode follower tubes 109 and 112 are relatively small and, furthermore, it is characteristic of cathode follower tubes that their output impedances, determinative of time-constant effect, are proportional to the ratio of load impedance to transconductance.

The use of a cathode follower tube such as represented by tubes 109 and 112 vastly increases the sensitivity of the sorting apparatus because it permits the use of a pentode amplifier 99 with a high resistance load 102 in addition to very high capacity coupling condenser 108. Notwithstanding the large value of electrical constants of the elements 102 and 108, the use of the cathode followers 109 and 112 furthermore increases the accuracy of operation by permitting the condenser 108 to be normalized through the switches 83, 84 and 107 very rapidly during the time interval permitted within an operating cycle which must be very small in the case of presentation of articles to be sorted at a high rate of speed. I have found, for example, that an accuracy and stability exceeding 100 times that obtainable without the use of cathode followers have been obtained. The gain in stability is the product of the increase in size of coupling condenser and of the increase in rapidity of normalizing. Inasmuch as the value of automatic sorting depends upon the fineness of decisions which may be made in rejecting or accepting articles deviating but slightly from the background or standard in reflected power, any increase in sensitivity is of the utmost importance. Reliable operation of a photoelectric sorting machine in response to a change of one per cent in illumination of a photoelectric tube has heretofore been possible. However, I have been able to obtain response reliably to changes only one hundredth as great by use of the arrangement herein described, because of a hundred-fold increase in stability.

The increased precision and speed obtained is of particular value in certain locations, such as in tropical countries, e. g. where the difficulty of maintaining insulation and overcoming the effects of moisture is very great and these effects are highly deleterious owing to producing changes in the effective resistances of circuit constants and introduction of leakage paths allowing the setting of the apparatus to drift from one operating cycle to the next, unless the arrangement described herein is employed. Obtaining reliable operation entails consideration not only of the precision obtainable when the apparatus is first installed and immediately after adjustment, but also the point at which the apparatus will respond without resetting after a period of time. Numerous factors tend to change the effective setting such as aging of amplifier tubes, variation in filament voltage, imperfect socket connections of lamps and tubes, change in cathode emission, aging of photo tubes, change in resistance of photo tube load resistors and changes in other resistors, dirt or fingerprints on lens surfaces, dust on lamp or housing, aging of illuminating lamps, changing candle power and changes in lamp voltage.

In a multistage amplifier a two-volt drift in a tube results in a 40-volt drift in the next tube if the gain is only twenty to one. Thus, if one hundred volts is the signal obtained by a change from white to black of an object in the lamp housing or viewing chamber, a two-volt drift of a tube would cause serious error. In my apparatus all these sources of error are compensated for during each cycle between viewing of successive objects.

Although for the sake of simplicity I have illustrated an arrangement in which a single photoelectric tube 98 is employed in connection with mirrors 91 and 92 for viewing all sides of an object in the gravity sorter, it is to be understood that my invention is not limited thereto. For example, as illustrated in Fig. 12, if desired, three photoelectric tubes 147, 148 and 149 may be provided, which are mounted at the side walls of the lamp housing 16 alternate with the positions of the backgrounds 97. In this case separate amplifiers 151, 152 and 153 are provided for each photoelectric tube, arranged for tripping parallel connected thyratrons 154, 155 and 156. The arrangement is such that if any one of the photoelectric tubes 147, 148 and 149 is illuminated in excess of the standard value (or less in the case of dark trip) one or the other of the thyratrons 154, 155 and 156 is ignited and current is caused to flow through the tripping coil 72 as in the arrangement of Fig. 13. Once during each operating cycle the anode circuits to all of the thyratrons 154, 155 and 156 are broken by the insulating portion of the drum 79 between the brushes 81 and 82.

The hexagonal lamp housing 16, or housing with optical elements spaced at 60 degrees or multiples thereof, has the advantage of a high degree of versatility as it may be employed, as shown in Figs. 12 and 13, for obtaining illumination on all sides of an object in the gravity sorter integration of reflectivity of substantially the entire surface or photoelectric response to all sides thereof. In addition, it may be used in connection with point-by-point or two-dimensional scanning, such as described in my co-pending application Serial No. 3,876 filed January 23, 1948, now Patent 2,474,230, granted June 28, 1949. It may, if desired, also be employed in cases where it is desired or necessary to observe only one side of the object, in which case only one of the photoelectric tubes 147, 148 and 149 and one corresponding amplifier and tripping mechanism need be employed.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention, the scope of which is set forth in the claims annexed hereto and those presented in my co-pending divisional applications, Serial Number 265,862, filed January 4, 1952, and Serial Number 320,802 filed November 15, 1952.

What I claim is:

1. In a photoelectric sorter for freely falling articles, an enclosed lamp housing of the type evenly illuminating an article falling through the center thereof, having an upper gate above and selecting mechanism below with a free passage therebetween, for articles to be sorted, shielded from extraneous light, the selecting mechanism being vertically below the upper gate, and having normal and actuated positions for directing falling articles to one or another of two paths, timing mechanism for intermittently opening and closing the upper gate, means for depositing articles one at a time upon the upper gate each time it is in a closed position, the upper gate being of the dropping leaf type, whereby opening thereof imparts no motion to the article other than that caused by the acceleration of gravity, and the upper gate comprising a plurality of symmetrical, symmetrically disposed leaves, sloping down toward a center point when the upper gate is closed for centering articles deposited thereon to provide a uniform path for articles falling through the lamp housing, light responsive means communicatively connected with the lamp housing for actuating the selecting mechanism to shift it from one position to another, and mechanism connected to and synchronous with the upper gate operating mechanism for resetting the selecting mechanism in normal position.

2. In a photoelectric sorter for freely falling articles, a lamp housing having an upper gate with a free passage therebelow for articles to be sorted, a light responsive means communicating with said lamp housing, a longitudinal conveyor having a delivery end above said gate and including article spacing means of the progressively moving type, gate opening and closing mechanism, article selector mechanism below operatively connected to said light-responsive means and capable of actuation for determining the path of an article below the lamp housing according to the response to light of the article in the lamp housing, and a connected drive for said conveyor and said gate mechanism, with such a speed ratio as to open said gate as frequently as said conveyor advances an amount representing the spacing of said article spacing means, said upper gate being of the dropping-leaf type comprising a plurality of symmetrical, symmetrically disposed leaves, sloping down toward a center point when the upper gate is closed, whereby opening the gate imparts no motion to the article other than that caused by the acceleration of gravity.

3. In a photoelectric sorter, light responsive electric signal producing means including an electronic amplifier of the type having a movable switch therein and capable of being accurately calibrated by movement of the switch to one position and of being rendered sensitive by movement of the switch to another position, an enclosed lamp housing of the type evenly illuminating an object falling through the center thereof, said lamp housing having an upper gate of the dropping leaf type with a passage therebelow through the center of the lamp housing for objects being sorted, said upper gate comprising a plurality of symmetrical, symmetrically disposed leaves, sloping down toward a center point when the upper gate is closed for centering objects deposited thereon to provide a uniform path for objects falling through the lamp housing, gate opening and closing mechanism, driving mechanism for synchronously operating said gate mechanism with said amplifier switch, to hold the switch in position rendering the amplifier sensitive during the period of time that an object is within the lamp housing in consequence of the acceleration of gravity acting thereon during the interval following the instant when the upper gate is opened, and to restore the switch to calibrating position at other times, and object selecting mechanism below the lamp housing actuated by such signal producing means according to the reflectivity of objects falling through the lamp housing.

4. A sorting device comprising gate means, a conveyor for depositing objects singly at timed intervals upon the gate means, said gate means having openable leaves sloping down toward a center point for holding each object as deposited thereon by said conveyor and centering it, mechanism for opening the leaves downward to release the object held from such a uniform fixed position and to allow the object to fall freely therefrom, a chamber below the gate means with photoelectric means communicating with the chamber for measuring the light reflectivity characteristics of the object while so falling, drive means for said conveyor and said gate opening means, and means for actuating said gate means and said photoelectric means in timed relationship.

5. In a photoelectric sorter for freely falling articles, an enclosed lamp housing of the type evenly illuminating an article falling through the center thereof, having an upper gate above and selecting mechanism below with a free passage therebetween for articles to be sorted, shielded from extraneous light, the selecting mechanism being vertically below the upper gate and having normal and actuating positions for directing falling articles to one or another of two paths, the upper gate being adapted to have an article deposited thereon when it is in the closed position, and comprising a plurality of symmetrical, symmetrically disposed leaves, each sloping downward toward a center point at one end thereof when the upper gate is closed, for centering articles deposited thereon, each of said leaves being pivoted at the other end thereof with the inner end adapted to drop for opening the gate whereby opening thereof imparts no motion to the article other than that caused by the acceleration of gravity and there is no component of horizontal motion, and light responsive means communicatively connected with the lamp housing for actuating the mechanism to shift it from one position to another for classifying articles deposited upon the upper gate and dropped through the lamp housing.

6. In a sorting machine for fragile articles, a gate for diverting articles not to be accepted, a shaft for supporting said gate pivotally, an arm secured to said shaft, oscillating drive mechanism including a vertically reciprocating member for intermittently bearing against said arm, means for resiliently biasing the arm, a catch for holding said arm against the force of the biasing means slightly above the lowermost position of said reciprocating member, and means responsive to the character of the articles being sorted to release said catch, synchronizing means for causing the release operation to occur only when the reciprocating member is in a position to move said arm away from the catch, whereby the catch may be released without frictional hindrance and the motion of the gate in the event of being released is determined by the motion of said reciprocating member.

DAVID C. COX.

References Cited in the file of this patent

UNITED STATES PATENTS

| Number | Name | Date |
|---|---|---|
| 674,503 | Haegg | May 21, 1901 |
| 781,437 | Lelarge | Jan. 31, 1905 |
| 1,308,063 | Gray | July 1, 1919 |
| 1,394,445 | Rogers | Oct. 18, 1921 |
| 1,677,014 | Benford | July 10, 1929 |
| 1,722,751 | Jones | July 30, 1929 |
| 1,927,217 | Price | Sept. 19, 1933 |
| 1,943,278 | Thompson | Jan. 9, 1934 |
| 1,946,307 | Chambers | Feb. 6, 1934 |
| 1,961,913 | Reynolds | June 5, 1934 |
| 2,035,329 | McPhail | Mar. 24, 1936 |
| 2,131,095 | Cox | Sept. 27, 1938 |
| 2,131,096 | Cox | Sept. 27, 1938 |
| 2,164,513 | Gaebel | July 4, 1939 |
| 2,229,451 | Gulliksen | Jan. 21, 1941 |
| 2,405,483 | Abrams | Aug. 6, 1946 |
| 2,436,762 | Turin | Feb. 24, 1948 |
| 2,444,751 | Scott | July 6, 1948 |
| 2,467,773 | Parker | Apr. 19, 1949 |
| 2,504,731 | Rose | Apr. 18, 1950 |

FOREIGN PATENTS

| Number | Country | Date |
|---|---|---|
| 18,035 | Great Britain | of 1914 |
| 294,575 | Great Britain | Sept. 19, 1928 |
| 744,107 | France | Jan. 21, 1933 |
| 492,035 | Great Britain | Sept. 14, 1938 |